(12) United States Patent
Montgomery et al.

(10) Patent No.: US 8,514,352 B2
(45) Date of Patent: Aug. 20, 2013

(54) PHOSPHOR-BASED DISPLAY

(75) Inventors: David James Montgomery, Oxfordshire (GB); Peter John Roberts, Oxford (GB); Lesley Ann Parry-Jones, Sutton Courtenay (GB); Emma Jayne Walton, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 301 days.

(21) Appl. No.: 12/964,846

(22) Filed: Dec. 10, 2010

(65) Prior Publication Data

US 2012/0147296 A1    Jun. 14, 2012

(51) Int. Cl.
*G02F 1/1335*    (2006.01)

(52) U.S. Cl.
USPC ................. 349/108; 349/62; 349/63; 349/64; 349/65; 349/66; 349/67

(58) Field of Classification Search
USPC ...................................................... 349/62–66
See application file for complete search history.

(56) References Cited

U.S. PATENT DOCUMENTS

| | | |
|---|---|---|
| 5,146,355 A | 9/1992 | Prince et al. |
| 5,608,554 A | 3/1997 | Do et al. |
| 6,473,144 B1 | 10/2002 | Ichikawa et al. |
| 6,864,626 B1 | 3/2005 | Weiss et al. |
| 7,339,638 B2 | 3/2008 | Kitamura |
| 2007/0047221 A1 | 3/2007 | Park |
| 2008/0074583 A1* | 3/2008 | Li et al. ........................... 349/71 |
| 2008/0084517 A1 | 4/2008 | Itou et al. |
| 2012/0013654 A1 | 1/2012 | Yashiro et al. |

FOREIGN PATENT DOCUMENTS

| | | |
|---|---|---|
| JP | 2004/099664 A1 | 11/2004 |
| JP | 2008-096547 A | 4/2008 |
| JP | 2009-543130 A | 12/2009 |
| JP | 2010-066437 A | 3/2010 |
| WO | 2010/116559 A1 | 10/2010 |

OTHER PUBLICATIONS

International Search Report and Written Opinion for corresponding International Application No. PCT/JP2011/078637 mailed Feb. 28, 2012.

* cited by examiner

*Primary Examiner* — Phu Vu

(74) *Attorney, Agent, or Firm* — Renner, Otto, Boisselle & Sklar, LLP

(57) ABSTRACT

A phosphor-based multi-colored display is provided which includes a spatial light modulator comprising an addressable array of apertures each corresponding to a respective sub-pixel in the display; an array of phosphor regions each indexed to a corresponding aperture of the spatial light modulator; and a backlight which provides quasi-monochromatic light to phosphor within each of the phosphor regions. The phosphor within each of the phosphor regions, upon being excited by the quasi-monochromatic light of the backlight, emits light having a color different from a color of the quasi-monochromatic light, through the corresponding aperture of the spatial light modulator.

18 Claims, 14 Drawing Sheets

PHOSPHOR-BASED DISPLAY

TECHNICAL FIELD

The present invention relates to a colour display that includes an electrically addressable spatial light modulator. Furthermore, the present invention relates to a spatially extended illumination panel that may be used for general lighting. In particular, the invention pertains to a colour display that has high efficiency and can be used in devices such as mobile phones, PDAs, computer monitors and liquid crystal display (LCD) TVs.

BACKGROUND ART

JP 2008096547 (O. Ito et al.; published Apr. 24, 2008) describes a display which uses an arrangement of localized phosphors to act as local light sources for a display. The phosphors are placed between two lens sheets. The lower lens sheet acts to focus light from a collimated backlight into the phosphors. The second lens sheet acts to focus light emitted by a phosphor though a selected TFT aperture of an LCD panel. The phosphor and dual lens-array assembly is separated from the main part of the display.

JP 2010066437 (O. Ito et al.; published Mar. 25, 2010) describes a display in which an arrangement of localized phosphors is placed above an LC panel and a collimated backlight. Light from the collimated backlight is focused through the TFT apertures of the display panel and into the correctly indexed phosphor region. This arrangement is subject to unwanted phosphor excitation by ambient light. Some ambient light also reflects in the chambers that house the phosphors. These aspects can lower the contrast of the display unless viewed in a darkened environment.

WO 2004/099664 (T. Jüstel; published November 2004) describes a phosphor on a lightguide which may be excited from rays leaking from the lightguide. The publication does not cover pixilated arrangements appropriate for making a display.

U.S. Pat. No. 7,339,638 (K. Kitamura; published Apr. 13, 2006) uses a dual lens layer, each layer containing lenses near every LC pixel. Colours are separated by angle and pass through the LC. This system is more suited to a projector than a display.

U.S. Pat. No. 5,146,355 (J. Prince et al.; published Sep. 8, 1992) describes an arrangement of phosphors situated below an LC panel. A transflective configuration is described.

U.S. Pat. No. 6,864,626 B1 (S. Weiss et al.; published Mar. 8, 2005) describes display configurations involving optically pumped luminescent nanocrystals.

U.S. Pat. No. 5,608,554 (Y. Do et al.; published Mar. 4, 1997) describes an LCD which contains a phosphor layer and a backlight source with a main emitting peak in the region 380-420 nm. The phosphor distribution resides on the opposite side of the LC layer from the backlight.

U.S. Pat. No. 6,473,144 (N. Ichikawa et al., published Oct. 29, 2002) and US 2007/0047221 (S. Park; published Mar. 1, 2007) use a holographic array or diffractive gratings to separate colours and focus them onto separate pixels. This approach is technically demanding and expensive to implement.

SUMMARY OF INVENTION

According to an aspect of the invention, a phosphor-based multi-coloured display is provided which includes a spatial light modulator comprising an addressable array of apertures each corresponding to a respective sub-pixel in the display; an array of phosphor regions each indexed to a corresponding aperture of the spatial light modulator; and a backlight which provides quasi-monochromatic light to phosphor within each of the phosphor regions. The phosphor within each of the phosphor regions, upon being excited by the quasi-monochromatic light of the backlight, emits light having a colour different from a colour of the quasi-monochromatic light, through the corresponding aperture of the spatial light modulator.

According to another aspect, the colour of the quasi-monochromatic light is one of red, green, blue and yellow, and the colour of the light emitted by the phosphor regions comprises one or more of the others of red, green, blue and yellow.

In accordance with another aspect, the array of phosphor regions further including scattering regions in between the phosphor regions with the scattering regions also being indexed to corresponding apertures of the spatial light modulator, wherein the backlight provides the quasi-monochromatic light to scattering material within each of the scattering regions and the scattering material scatters the quasi-monochromatic light though the corresponding aperture of the spatial light modulator.

According to another aspect, the backlight comprises a lightguide and a quasi-monochromatic light source which introduces the light into the lightguide from a side of the lightguide, and the array of phosphor regions is located directly above the lightguide such that light is extracted directly from the lightguide into the phosphor regions.

According to yet another aspect, a distance of separation between the phosphor regions and the corresponding apertures is less than a size of the corresponding apertures.

According to another aspect, the display further includes a colour filter associated with each aperture.

In accordance with another aspect, the plurality of phosphor regions are positioned within corresponding chambers which act to redirect light emitted by the phosphor towards an outward normal of the display.

In still another aspect, walls of the chambers are formed by mirrored sections and/or low index regions.

In yet another aspect, the shape of the chambers approximate compound parabolic reflectors.

According to another aspect, the display further includes an interference filter between the array of phosphor regions and the backlight, the interference filter being designed to allow the quasi-monochromatic light to pass through and excite the phosphor within the phosphor regions over a predefined angular acceptance range, and to reflect the light emitted by the phosphor away from the backlight.

According to another aspect, the backlight includes a blue light source.

In accordance with still another aspect, the backlight includes a UV light source.

According to another aspect, the array of phosphor regions includes phosphor regions respectively including red, green and blue phosphors.

In accordance with another aspect, light from the backlight passes through the array of phosphor regions by way of top apertures within the array of phosphor regions, and the display further includes reflectors positioned between the array of phosphor regions and the spatial light modulator which reflect the light passing through the array of phosphor regions back towards the phosphor regions to excite the phosphor therein.

According to another aspect, the spatial light modulator includes at least one of a liquid crystal cell and a polymer dispersion liquid crystal cell.

According to another aspect, the backlight is a quasi-collimated backlight.

In accordance with still another aspect, the display further includes a lens array for focusing the collimated light into the phosphor regions.

In yet another aspect, the backlight includes a lightguide.

According to another aspect, the backlight is a direct view backlight.

The invention relates to an optical arrangement that can be used to improve the efficiency of a liquid crystal display (LCD). As illustrated in cross-section in FIG. 2, this arrangement includes a quasi-monochromatic backlight 20, a layer 21 containing a patterned array of phosphor and scattering material, and a spatial light modulator such as an LCD display panel 1n. By "quasi-monochromatic" or single colour light source, it is meant that the backlight 20 emits light over a narrow spectral range in comparison to the spectral range of visible light. The backlight spectral range is narrow compared to the absorption bandwidth of chosen phosphors. Excitation of the phosphors by the quasi-monochromatic light results in the phosphors emitting light of generally another, different, colour component or components. Each individual phosphor region in the layer 21 acts as a local light source for a colour sub-pixel of the display. In a preferred embodiment, red and green light emitting phosphors are excited by a blue backlight (although it will be appreciated that other colour arrangements may be utilized without departing from the scope of the invention). Light from the red and green phosphors, after passing through a liquid crystal cell, polarisers and correctly indexed TFT aperture 38, form the red and green sub-pixels of the display. The blue sub-pixels are formed by scattering elements or regions 26 within the array layer 21 which elastically scatter the LED light.

The efficiency of the device is increased primarily due the much reduced absorption in colour filters compared to current state of the art displays. In some embodiments of the invention, the colour filters are removed altogether.

In some embodiments of the invention, the phosphors are located directly above a lightguide. Light of appropriate wavelength from one or more light emitting diodes enters the lightguide from its sides. Light is extracted directly from the lightguide into the phosphor or scattering regions, but is prevented from leaving elsewhere due to a refractive index step maintaining total internal reflection. This display geometry is highly compact and is an integrated form in the sense that air gaps are eliminated from the main part of the display. Aside from enabling an ultra-thin display, this aspect reduces unwanted Fresnel reflection losses, increases the robustness of the display and reduces the possibility of contamination from the environment.

Other embodiments of the invention rely on light from a quasi-collimated backlight being focused into the phosphor regions by a lens sheet. An example is shown in FIG. 8. Several designs are available for the collimated backlight. Some examples are shown in FIGS. 9(a)-9(d). The designs in FIGS. 9(a)-9(c) rely upon extraction features situated on a planar lightguide. The geometry of these features is optimized to give good collimation in the extracted light about the normal to the lightguide. The extraction features may be sub-wavelength, as in the example shown in FIG. 9(a), and hence diffractive in nature. To increase extraction efficiency and control uniformity, the lightguide may be wedge shaped with a small wedge angle that can vary along the lightguide. Alternatively, a number of separate shallow wedge features can be applied to one or both interfaces of the lightguide. FIG. 9(d) shows an example of collimated direct view backlight. Light from a tiled arrangement of single reflection light-emitting diodes (SRLEDs) 75 forms the backlight. Each SRLED 75 comprises an emitting LED chip 76 and a curved mirror 77. Light from the LED chip 76 is reflected in the mirror 77 towards the normal direction.

Many lightguide-based collimated backlight schemes give much better collimation in one direction than in the other. If such backlights are used, it is appropriate to use a lenticular lens and phosphor arrangement. If a backlight showing good collimation in both directions is used, then a pixilated lens and printed phosphor arrangement is preferred. Even if a lenticular phosphor arrangement is adopted, the phosphor lines need to be periodically interrupted in order aid the extraction of downconverted light from the phosphors.

The phosphors are deposited inside chambers which act to focus the light emitted from the phosphors towards the display normal. The phosphors are preferentially localized to regions considerably smaller than a sub-pixel. This localization increases the collimation of the downconverted light that can be attained so that the majority of the light can pass through the correctly addressed TFT aperture 38. In this way, loss from colour filters and the black-mask associated with the TFT array is greatly reduced leading to further efficiency enhancement.

Referring again to FIG. 2, phosphor and scattering regions are formed within chambers defined at least in part by mirrored sections 28 made of reflective metal or the like, and/or low refractive index regions 27. The chambers serve to re-direct light that is emitted sideways into the upwards direction. An interference filter 42 (FIG. 5) can be placed below the phosphor layer to reflect downward propagating light emitted by the phosphor. The interference filter 42 is designed to allow light at the LED wavelength to pass through over a defined angular acceptance range.

Use of a single colour LED and the remote phosphor arrangement removes a component of loss that manifests in displays which rely on white LEDs. A white LED contains phosphors within its packaging. Due to the diffuse nature of light emitted by a phosphor and scattering cause by the phosphor, LED package loss is larger for white LEDs than for single colour ones.

The efficiency enhancements described above allow for a brighter display and/or a lower power usage. The latter aspect leads to a lower environmental impact. At a given brightness, the lower power required leads to a longer battery life for a mobile device.

The remote phosphor backlight described here can be applied to standard display panels, even if colour filters are present.

Instead of using a blue backlight and diffusive material to form a blue sub-pixel, a UV backlight can be used in which the blue sub-pixels are also phosphor based.

Additional phosphors can be used to provide more than three sub-pixel types. For example a yellow phosphor can be used with red and green ones and a blue backlight to form a RGBY display.

The LCD panel acts as a natural shield for ambient light. This implies that little UV or blue ambient light will excite the phosphors which would compromise contrast. The configuration also minimizes ambient light reflections within the phosphor chambers that could otherwise degrade the viewed images. In a display operating with a UV backlight, little of this light can escape from the device so as to present a health risk.

For small area display applications, the phosphors will be nanophosphors of known types. Here, the term nanophopsphor encompasses dye-molecule based and semiconductor nano-crystal based wavelength converters. These can be deposited within a resin by ink-jet printing or other known techniques. For larger area displays it may be possible to use standard phosphors.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIG. 5 illustrates an embodiment in which a planar wavelength selective filter is included to reflect downward propagating light at downconverted wavelengths. The filter is such that it allows backlight light to pass through.

Figure 1:
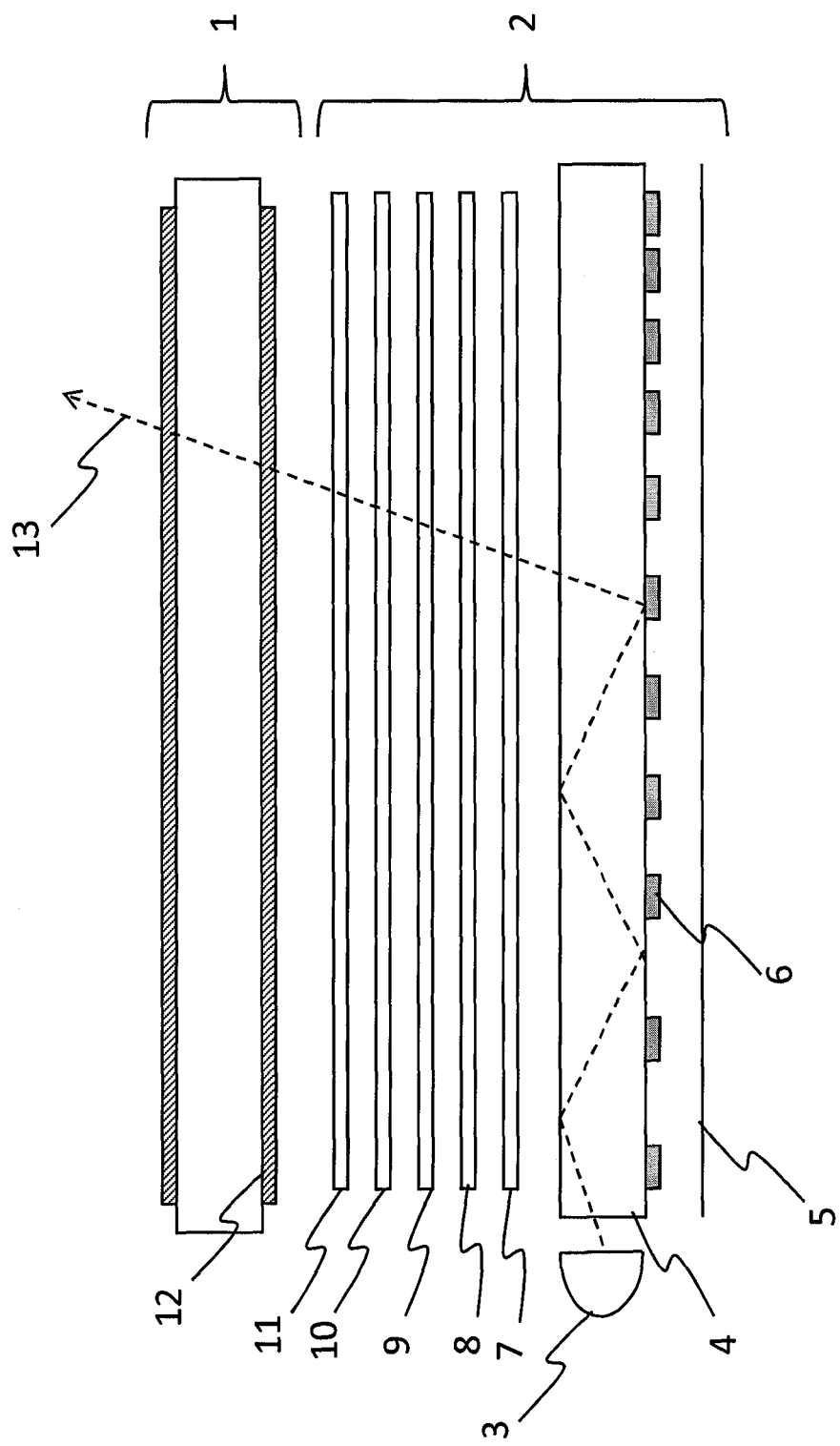
FIG. 1 illustrates a typical display of conventional type.

DESCRIPTION OF REFERENCE NUMERALS 1 refers to a conventional LCD panel comprising two polarizers, a liquid crystal cell and a TFT layer.
1$n$ refers to an LCD panel used in most embodiments of the invention.
2 refers to a conventional lightguide-based backlight unit.
3 refers to a light source such as an LED.
3$n$ refers to a blue light source such as an LED used in most embodiments of the invention.
3$u$ refers to a UV light source such as an LED used in one embodiment of the invention.
4 refers to a planar lightguide used in a conventional display.
4$n$ refers to a lightguide used in most embodiments of the invention.
4$p$ refers to a tapered lightguide.
5 refers to a mirror placed beneath the lightguide.
6 refers to features on the lightguide which induce extraction of light from the lightguide.
7 refers to a strong diffuser.
8 refers to a prism sheet.
9 refers to a prism sheet that is oriented in an orthogonal direction to prism sheet 8.
10 refers to a weak diffuser.
11 refers to an additional layer which can be an interference film.
12 refers to the rear polarizer of an LCD panel.
13 Shows the trajectory of a typical path through the system.
20 refers to a quasi-monochromatic backlight assembly used in several embodiments of the invention.
20$p$ refers to a collimated backlight.
21 refers to a layer containing the phosphor and scattering material that act as secondary light sources for the displays in the invention.
25$r$ refers to a red phosphor region.
25$g$ refers to a green phosphor region.
25$b$ refers to a blue phosphor region.
26 refers to scattering regions made up of scattering material such as elastic scattering material.
27 refers to low refractive index regions placed above and to the sides of the phosphor and scattering materials. Preferably this layer is formed of a material having a low refractive index.
28 refers to mirrored sections of the chambers that contain phosphors or scattering material.
29 refers to low refractive index material. This material may be air.
30 refers to the lower polarizer of the display.
30$i$ refers to an in-cell polarizer used as the lower polarizer of a display.
31 refers to a glass substrate layer.
32 refers to a liquid crystal cell.
33 refers to the TFT layer.
34 refers to a glass substrate layer.
35 refers to the top polarizer of the display.
36 refers to planarizing material such as a resin.
37 refers to corrugated features added to the bottom of the lightguide to control out-coupling of light from the lightguide into the phosphors and scattering material.
38 refers to apertures in the TFT and black-mask array through which light may pass.
41$r$ refers to a red colour filter.
41$g$ refers to a green colour filter
41$b$ refers to a blue colour filter.
42 refers to a reflecting band pass filter layer.
42$b$ refers to reflecting band pass filters placed under the phosphor and scattering materials.
51 refers to dielectric Mie scatterers.
52 refers to the dielectric medium such as a resin
53 refers to a dielectric buffer layer above the scatterer-containing medium.
53$a$ refers to a dielectric buffer layer.
53$b$ refers to a dielectric layer such as glass of polymer onto which microlenses or roughness may be added.

54 refers to an arrangement of microlenses.
62 refers to a substrate layer between microlenses and the phosphor containing layer.
63 refers to a microlens layer.
64 refers to an air gap between a collimated backlight and a focusing lens array.
71 refers to a layer placed above a planar lightguide into which a grating may be embossed or etched. Preferentially this layer has a low refractive index.
72 refers to a diffractive grating layer.
73 refers to non-diffractive extraction features placed on a lightguide.
74 refers to a light turning layer placed above a wedge lightguide.
75 refers to a single reflection LED (SRLED).
76 refers to the emitting chip of the SRLED.
77 refers to the curved mirror of the SRLED.
81 refers to extraction features placed on top of the display to aid extraction of light from the display.
91 refers to a polymer dispersed liquid crystal cell.
101 refers to angled reflectors used to reflect light from the quasi-monochromatic backlight into the phosphor and scattering region chambers.
D refers to the separation between the phosphors and the TFT layer.

DETAILED DESCRIPTION OF INVENTION

The present invention will now be described in detail with reference to the drawings, in which like reference numerals are used to refer to like elements throughout.

FIG. 1 illustrates a conventional small area liquid crystal display that is well known. The display consists of a liquid crystal display panel 1 and a backlight unit 2. The backlight unit 2 involves a white light source 3 that can be a fluorescent tube, an LED with phosphor, an RGB LED group, a laser or other light source. The chosen source is positioned at the edge of a thin lightguide 4. Light 13 entering the lightguide 4 from the light source 3 is guided by total internal reflection (TIR) unless interrupted by outcoupling features 6 positioned on one or both of the large faces of the lightguide 4. Any light that leaves a bottom interface of the lightguide 4 is reflected back up through it by a mirror 5. Light which leaves the top of the lightguide 4 generally has unfavourable angular characteristics and may suffer from small-scale spatial inhomogeneity. To rectify this, a strong diffuser 7, two crossed prism sheets 8 and 9 in orthogonal directions and a weak diffuser 10 are used to produce the correct angular distribution and ensure local homogeneity. Often the weak diffuser 10 is incorporated into the top prism layer 9. A further layer 11 can be added to the assembly. The layer 11 is typically an interference film that preferentially reflects one polarization and transmits the other. The reflected light is recycled through the diffusers 10 and 7 to become unpolarised and is them reflected by the mirror 5 toward the interference film 11 again. The result is that the light is polarized so that it is better transmitted by a rear polarizer 12 of the liquid crystal spatial light modulator (SLM) 1.

The optical efficiency of this conventional display is limited by many factors, including absorption loss in the colour filters, absorption in the black mask of the LCD pixels, absorption loss in the phosphor within the LED and loss in the LED packaging itself.

Figure 2:
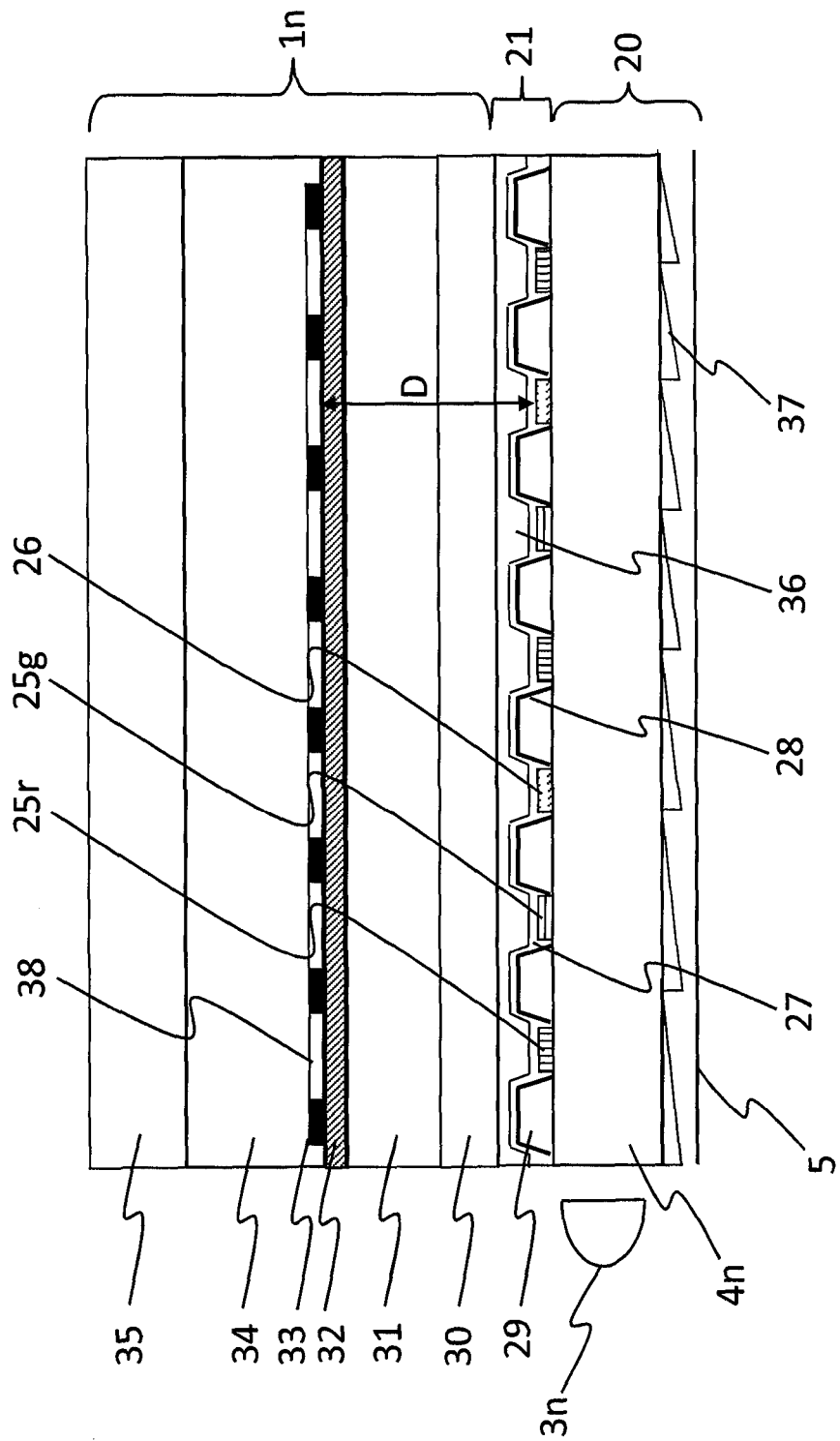
FIG. 2 illustrates preferred embodiment to the present invention.

A schematic representation of the preferred embodiment of this invention is shown in FIG. 2. Included in this embodiment is a liquid crystal display panel 1n, a lightguide 4n into which blue light is injected from one or more light sources 3n, and the patterned phosphor and scattering material layer 21 that acts as a local light source for illuminating the sub-pixels within the panel 1n. The layer 21 contains an arrangement of red and green phosphor regions 25r,25g containing red and green phosphor, respectively, and scattering regions 26 containing scattering material. The phosphor regions 25r and 25g act to absorb blue light and re-emit red and green light, respectively. The periodic patterning of the phosphor regions 25r,25g and scattering regions 26 coincides with that of the TFT sub-pixel array. The LCD panel 1n can be identical to one described in the conventional art except that the colour filter layer may be removed as will be appreciated.

The phosphor regions 25r,25g and the scattering regions 26 are contained within chambers that may be constructed from low refractive index regions 27 and/or mirrored sections 28. In the preferred embodiment, the phosphor and scattering material layer 21 resides directly above the lightguide 4n. Regions of low index material 29 between the phosphor regions 25r,25g and scattering regions 26 prevent light leakage from the lightguide 4n except into the phosphor regions 25r,25g or scattering regions 26. The low index material 29 may be air, for example, although other materials may be utilized as will be appreciated. A planarizing material 36 such as resin completes the layer 21.

The operation of the preferred embodiment proceeds as follows. Continuing to refer to FIG. 2, light from the light source 3n enters the lightguide 4n and subsequently enters into the phosphor regions 25r,25g and scattering regions 26. Ideally, all the light entering the phosphor regions 25r,25g is fully absorbed by the phosphors therein. Some of the light subsequently emitted by the phosphor regions 25r,25g or scattered in the scattering regions 26 may be reflected by the chamber walls as formed by the mirrored sections 28 and/or low index regions 27 so that it is redirected towards the outward normal to the display. Light that ultimately escapes upwards from one of the chambers acts as a local light source of appropriate colour for a sub-pixel of the display. This light enters the LC panel 1n comprising a bottom polarizer 30, a glass substrate 31, a liquid crystal cell 32, a TFT layer 33, a second glass substrate 34 and a second polarizer 35. Light from a phosphor or scattering chamber substantially passes through the correctly indexed TFT aperture 38 if the sub-pixel is in the "on" state and then diverges from the display where it may be viewed. To increase the fraction of light which can pass through the correct TFT aperture 38, the separation D between the phosphor and scattering material layer 21 and the TFT layer 33 should be small. Preferentially, D is smaller than the sub-pixel size (e.g., size of apertures 38). It is noted that the figures are not drawn to scale in such regard.

Figure 3:
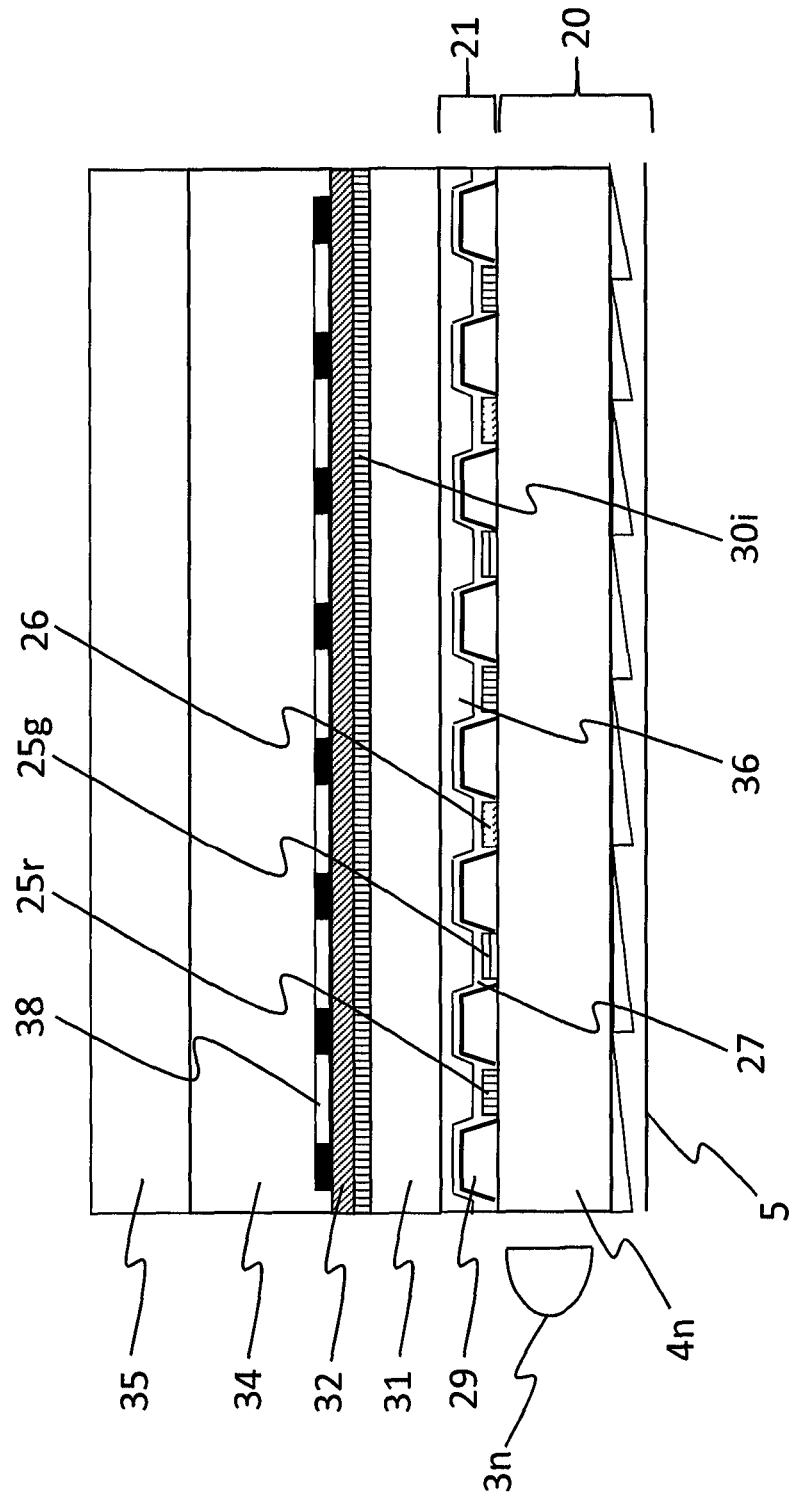
FIG. 3 illustrates an embodiment of the invention in which the lower polarizer is an in-cell type.

The bottom polarizer 30 and substrate 31 may be thinned from industry standard values by applying etching techniques. The bottom polarizer 30 may be replaced by an in-cell polarizer 30i as shown in FIG. 3. This revised design constitutes the second embodiment of the invention. The substrate layer 31 may be omitted so as to further reduce the distance between the phosphor and scattering regions and the TFT apertures 38.

Figure 4:
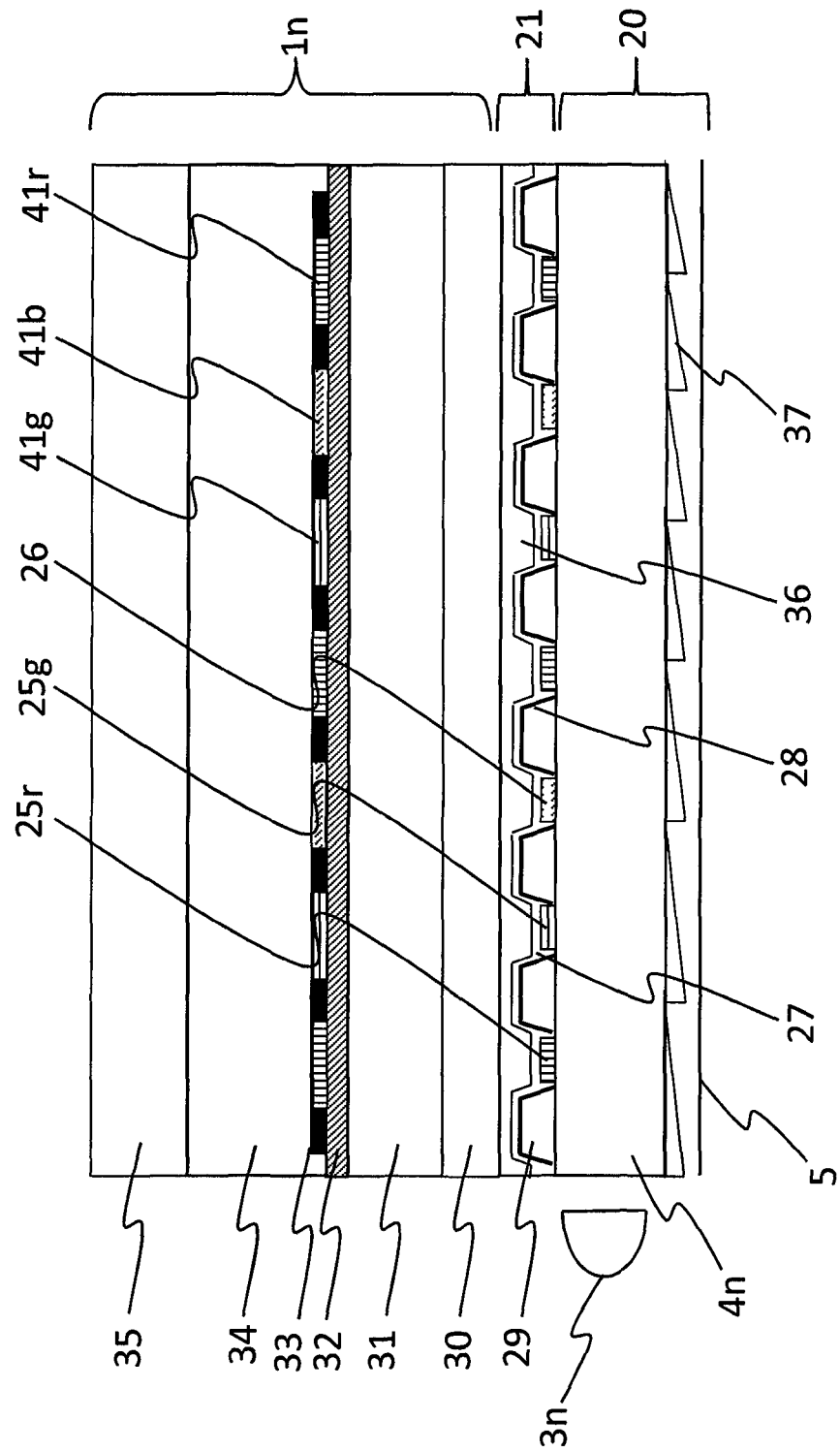
FIG. 4 illustrates an embodiment in which colour filters are included to reduce cross-talk.

Colour filters 41r, 41g, 41b may reside within or close to the TFT apertures 38. An example of this modification to embodiment one is shown in FIG. 4. The colour filters 41r, 41g, 41b are respectively aligned with the phosphor regions 25r,25g and scattering region 26 and act to reduce cross talk involving light from a local source of one colour passing through an incorrectly addressed sub-pixel with a different colour. For example, colour filter 41g prevents red light from phosphor region 41r from passing through the green sub-pixel. Since light rays emerging from a phosphor or scattering region chamber mostly head towards the correct colour filter, loss in the colour filters is much lower than in a standard panel. The filters can also act to adjust the colour balance and colour gamut range of the display at some expense to efficiency.

Since colour filters can be retained, it will be clear that the invention can be used in conjunction with standard, unaltered, LCD panels whilst still showing efficiency improvement.

Figure 5:
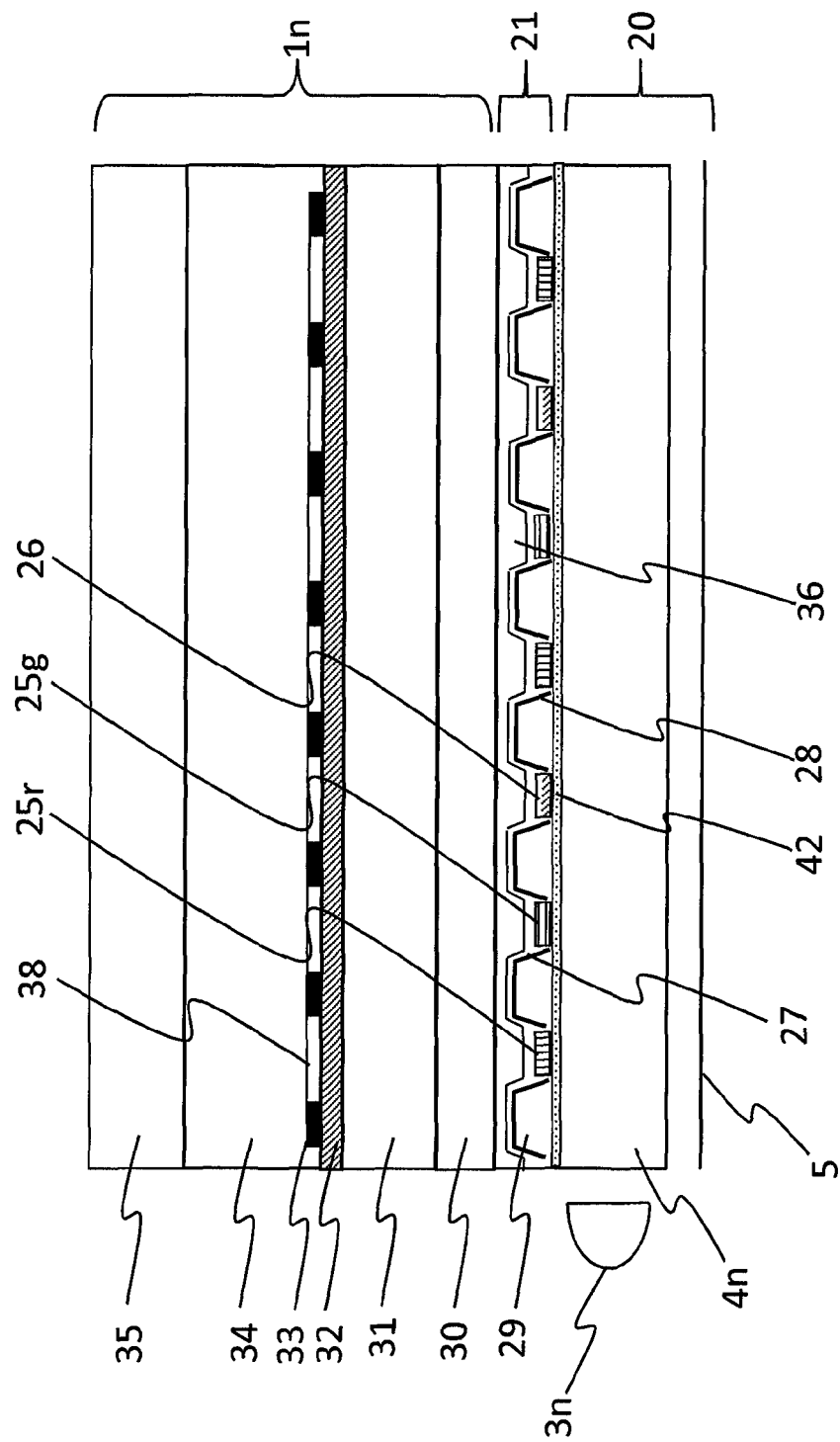
Figure 6:
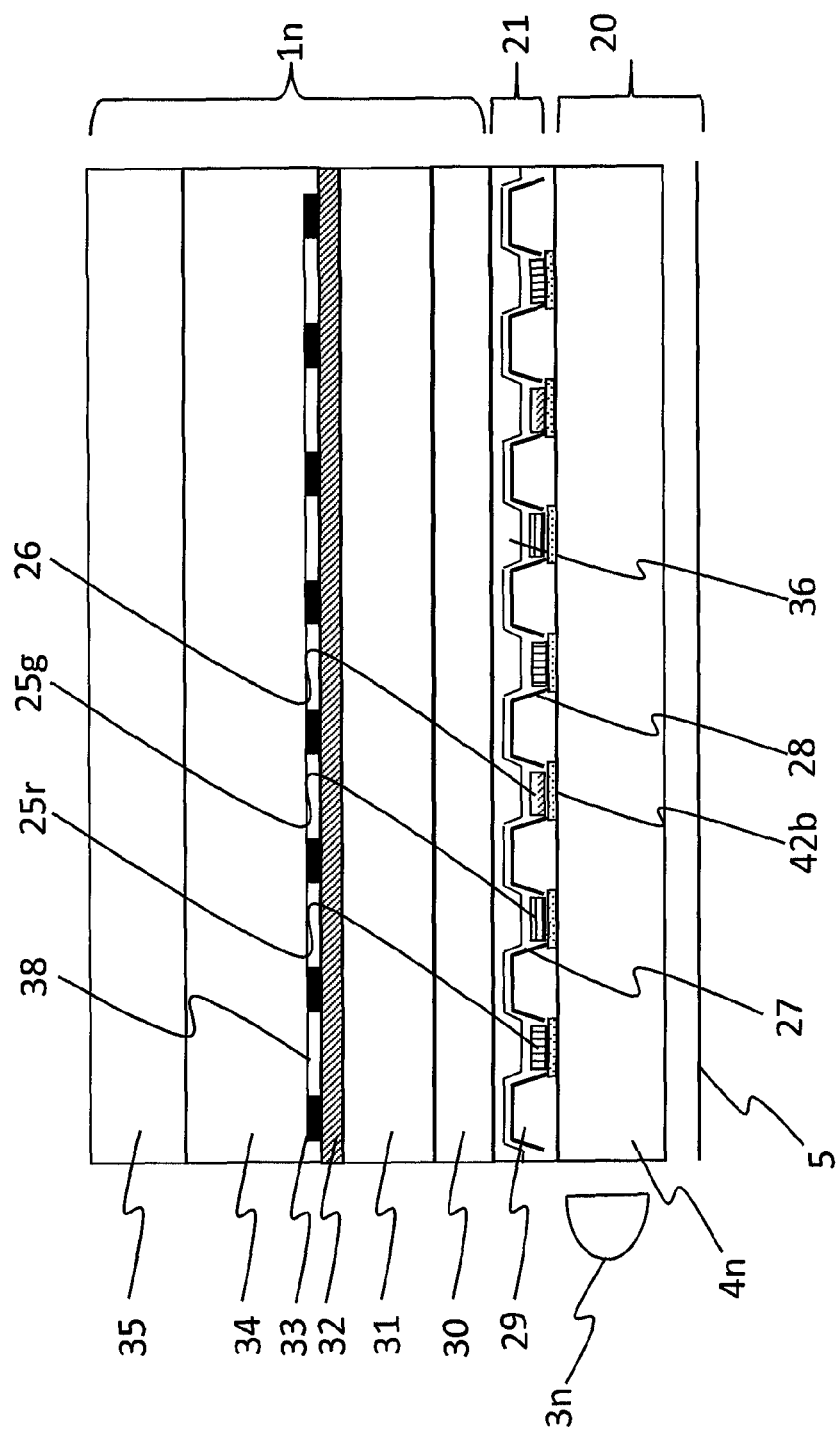
FIG. 6 illustrates an embodiment in which separate wavelength selective filters reside under each phosphor and scattering region.

A bandpass filter layer 42 may be placed between the lightguide 4n and the phosphor and scattering material layer 21 as shown in FIG. 5. The filter 42 is designed to transmit light at the primary light source 3n wavelength over the range of incident angles appropriate for light extraction from the lightguide. The filter 42 may be an interference or a thin metal layer based filter. The filter 42 may be patterned into individual filters 42b so as to exist only beneath the phosphor regions 25r,25g and the scattering regions 26, as shown in FIG. 6.

The phosphor materials as used herein may be dye or nano-crystal based nanophosphors.

Figure 7:
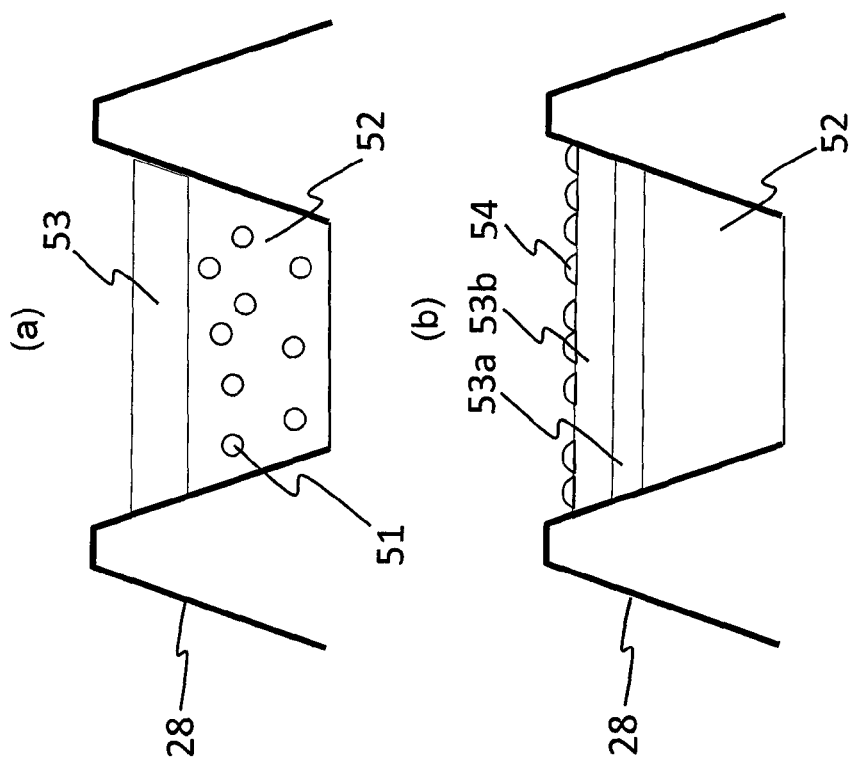
FIGS. 7(a) and 7(b) Illustrate respective means of achieving strong elastic scattering within blue sub-pixel chambers.

The blue light scattering material used in the scattering regions 26 may contain dielectric Mie scatterers 51 within a dielectric medium 52 such as resin. A dielectric buffer layer 53 is formed above the dielectric medium 52. The Mie scatterers 51 show a resonance at or near the primary light source 3n wavelength. The situation is shown schematically in FIG. 7(a). Instead of distributed scatterers 51, the necessary scattering may be produced by a random microlens array 54 or a roughened interface between media of different refractive index. The former case is illustrated in FIG. 7(b). For example, the microlens array 54 is formed on a dielectric layer 53b such as glass or polymer formed atop a different dielectric buffer layer 53a, which in turn is formed on the dielectric medium 52.

The lightguide 4n is illuminated by a light source 3n that emits over a narrow wavelength range, with a sub 50 nm bandwidth preferred. The light source 3n can be a packaged blue LED or laser.

Figure 8:
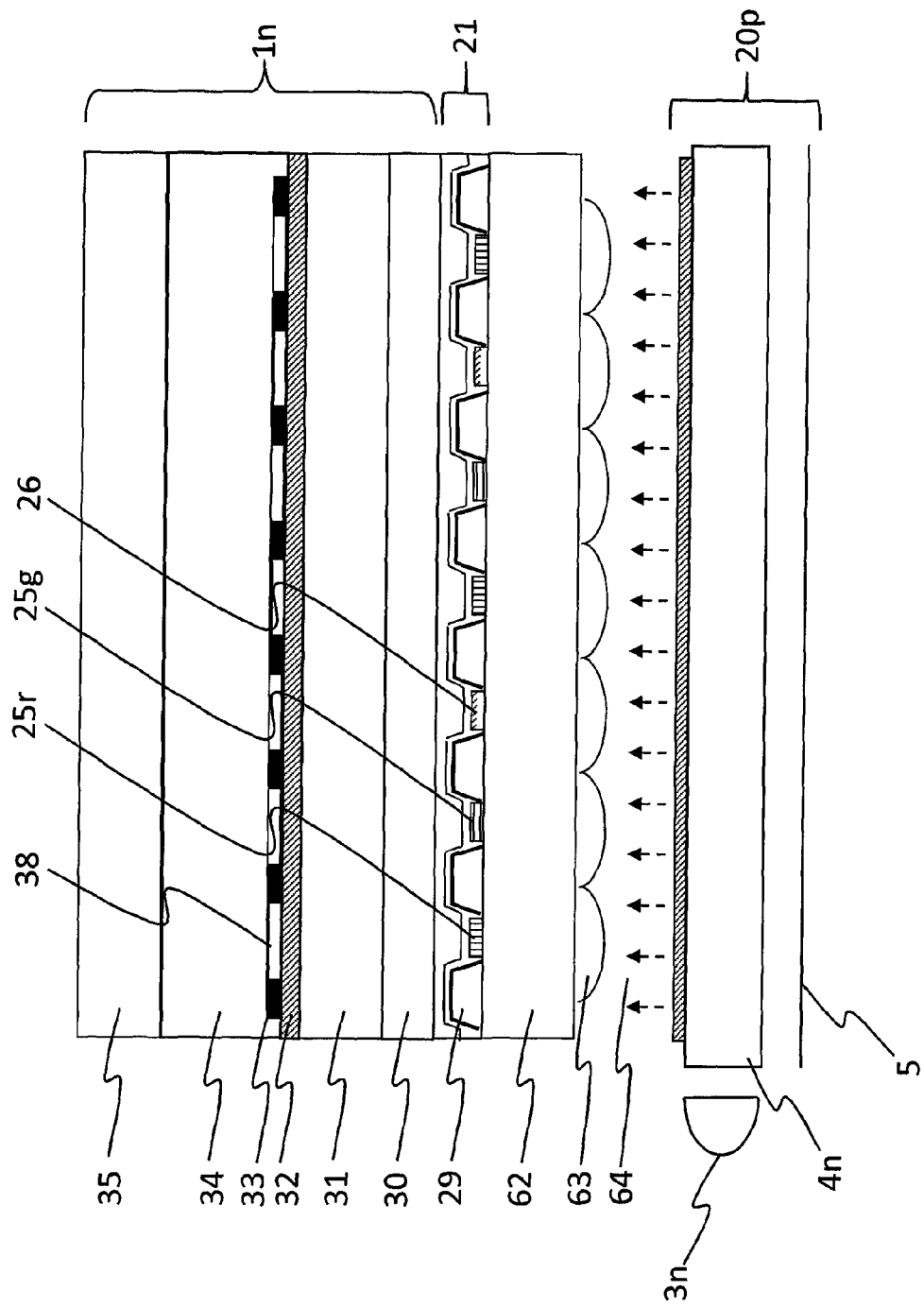
FIG. 8 shows an embodiment that incorporates a collimated backlight. Light from the collimated backlight is focused into the phosphor and scattering regions.

In a third embodiment of the current invention, the phosphor and scattering material layer 21 and LCD panel 1n are located above a collimated backlight 20p as shown in FIG. 8. A bottom glass substrate 62 and a lens array layer 63 are placed beneath the phosphor and scattering material layer 21. An air gap 64 exists between the backlight 20p and the rest of the assembly. The lens array layer 63 acts to focus light from the collimated backlight 20p into the phosphor regions 25r and 25g where the light is absorbed, and into the scattering regions 26 where it is elastically scattered. The action of the display after the phosphor excitation proceeds identically with the first embodiment described herein with respect to FIG. 2. A filter (not shown) may be placed beneath phosphor and scattering material layer 21 to reflect downwards propagating light emitted from the phosphors. This filter is designed to allow the narrow band collimated backlight light to pass though. The filter is easier to design and fabricate than its counterpart 42 in the embodiment of FIG. 5. It will also be less lossy.

Figure 9:
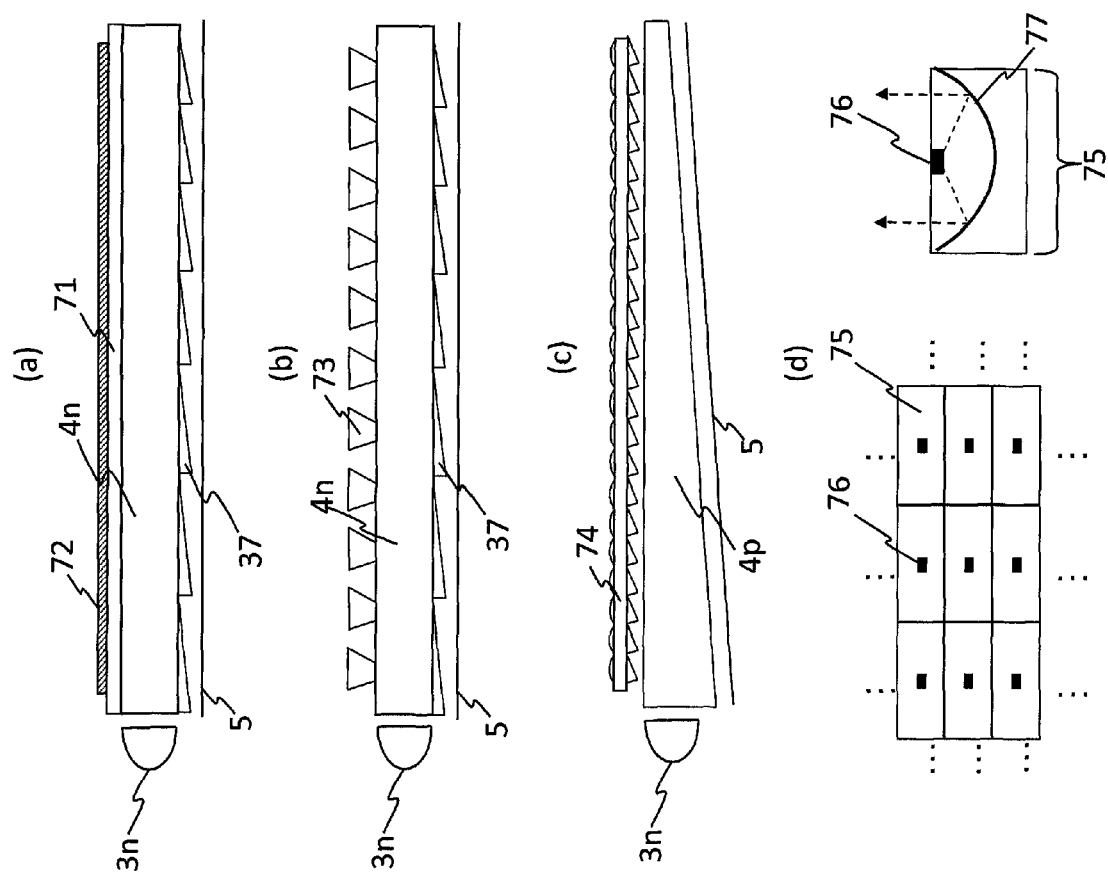
FIGS. 9(a), 9(b), 9(c) and 9(d) show respective examples of collimated backlight designs.

There are several known methods to realize the collimated backlight 20p. One example is shown in FIG. 9(a). The collimated backlight 20p includes the light source 3n, back reflector 5 and lightguide 4n. A planar layer 71 resides on top of the lightguide 4n. The layer 71 preferentially has a lower refractive index that the lightguide 4n, Diffractive features 72 are imprinted or etched on the top layer 71. These features extract light from the lightguide 42 only into angles close to the lightguide normal. To improve extraction efficiency and uniformity, wedge shaped features 37 are added to the lightguide 4n. Another example of a lightguide based collimated backlight is shown in FIG. 9(b). Extraction features 73, which may be produced by imprinting or etching techniques, are added to the top of the lightguide 42. These features 73 are substantially non-diffractive, being several times the wavelength in scale, and are designed to extract light into directions close to the backlight normal. In FIG. 9(c), a wedge-shaped lightguide 4p is used to control the light extraction rate. A turning film 74 is used to re-steer the light rays escaping from the lightguide 4n so that they are centered about the normal direction. In FIG. 9(d), an example of a collimated direct view backlight is given. It comprises a tiled array of single reflection light emitting diodes (SRLEDs) 75. Each SRLED gives collimated output by reflecting light from a small LED chip 76 in a curved mirror 77.

Many collimated backlight schemes, particularly those based on lightguides and LED light injection, give good collimation in one direction only. If such a backlight is used, it is sufficient to use a lenticular lens arrangement. If the chosen backlight gives collimation in two directions, the lenses should ideally be pixilated in two dimensions to maximize the benefit from focusing into the phosphors.

Figure 10:
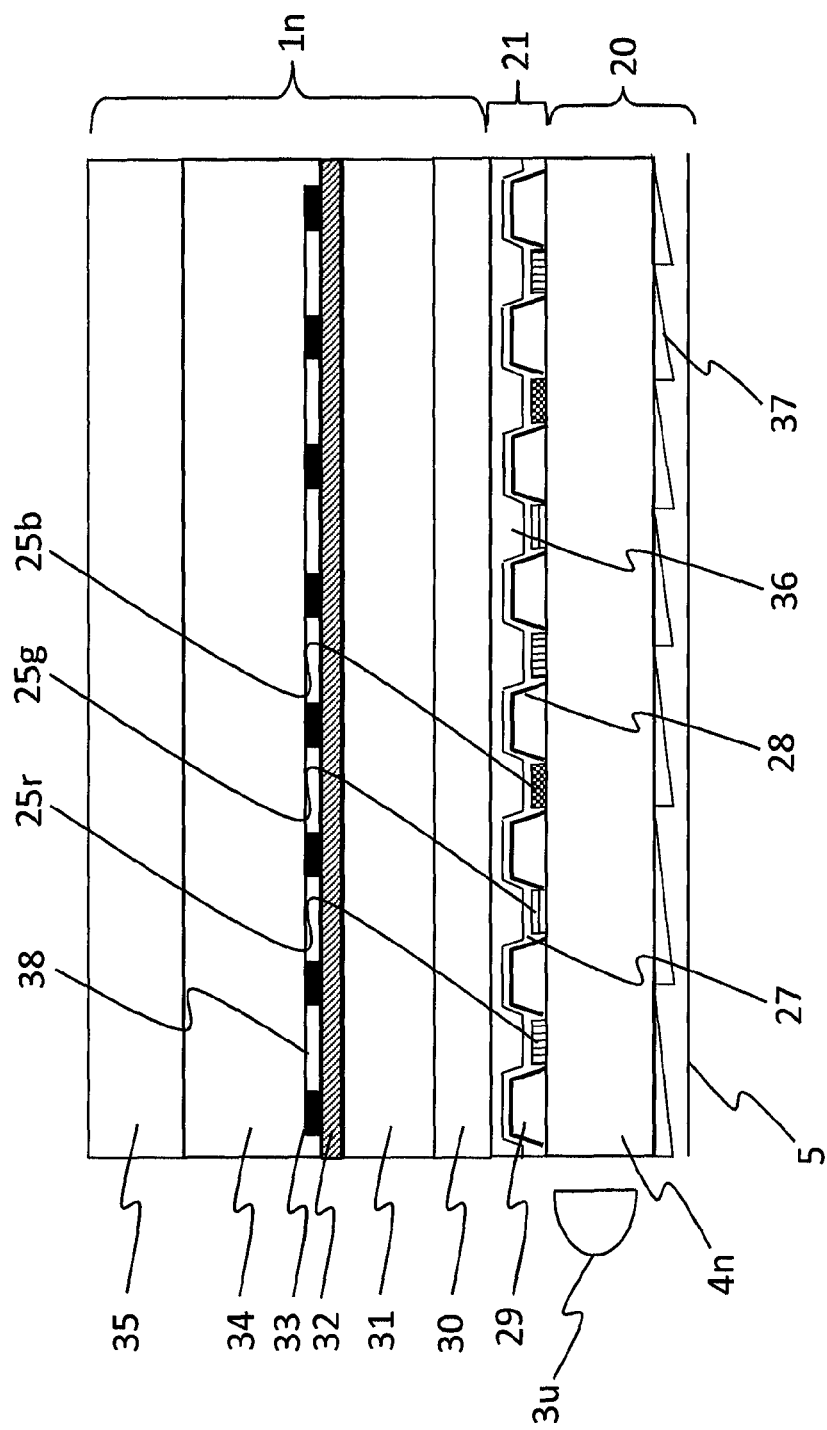
FIG. 10 shows an embodiment of the invention that incorporates a UV primary light source and red, green and blue phosphors.

A fourth embodiment of the invention is shown in FIG. 10. The blue light source has been replaced by a UV light source 3u. This light source 3u excites the red and green phosphors in regions 25r,25g as before. A blue phosphor in a corresponding phosphor region 25b replaces the scattering material and region 26 used in the preferred embodiment. Use of a UV source can lead to increased absorption and fluorescent loss in the lightguide and glass substrates. UV resistant materials should preferably be used in the device construction. The introduction of a wavelength shift in the blue sub-pixel, and the increased wavelength shifts in the red and green phosphors, implies the Stokes shift related efficiency loss inherent to the downconversion process has been increased. Nevertheless, this embodiment naturally leads to the angular properties of all colour pixel types being closely similar so that colour balance can be more easily maintained over a range of viewer angles.

It will be understood that the UV light source 3u and blue phosphor regions 25b can also be used to replace the blue light source 3n and scattering regions 26 in other embodiments described herein and remain within the scope of the invention.

In all embodiments described herein, a UV filter (not shown) may be incorporated into the display above the phosphor, or phosphor and scattering material, layer 21. This acts to prevent incursion of UV ambient light into the display, a small fraction of which could reach and excite the phosphors. If a UV primary source is used, the UV filter prevents ultraviolet exposure of the viewers from any residual un-converted UV light escaping from the device.

Figure 11:
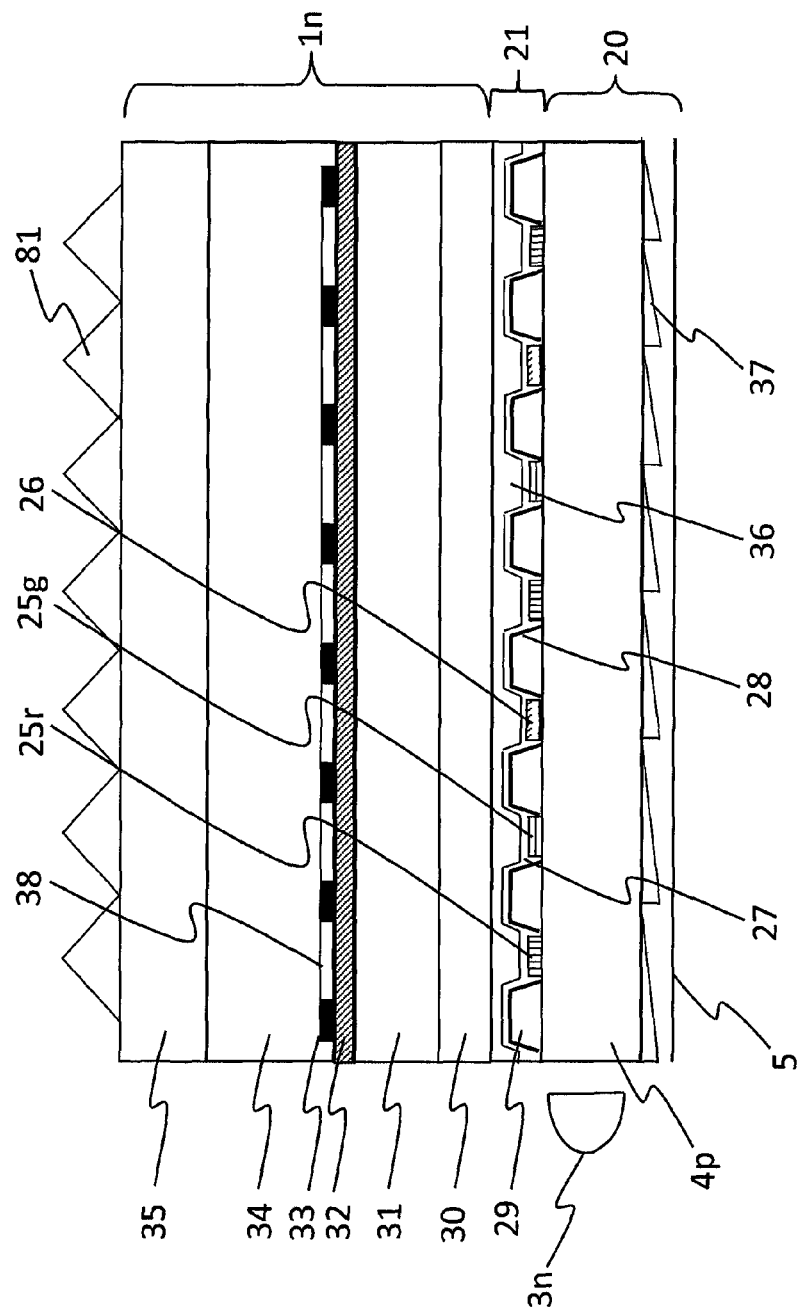
FIG. 11 shows an embodiment of the invention that includes extraction features placed to top of the liquid crystal panel.

A fifth embodiment of the invention is shown in FIG. 11. Features 81 are placed on the top interface of the embodiment of FIG. 2 to aid light extraction into air. These features 81 may be, but are not restricted to, microlens or pyramidal geometries (the latter example is shown schematically in FIG. 11). The features 81 can also be diffractive. Such extraction features 81 are only necessary if insufficient collimation of the light emerging from the phosphor and scattering chambers has been achieved. It is also only necessary if the separation D (e.g., FIG. 2) is small enough that rays close to or beyond the TIR condition at the top of the display can pass through the correctly addressed sub-pixel TFT aperture 38. It will be understood that the extraction features 81 can also be added to other embodiments detailed herein.

Figure 12:
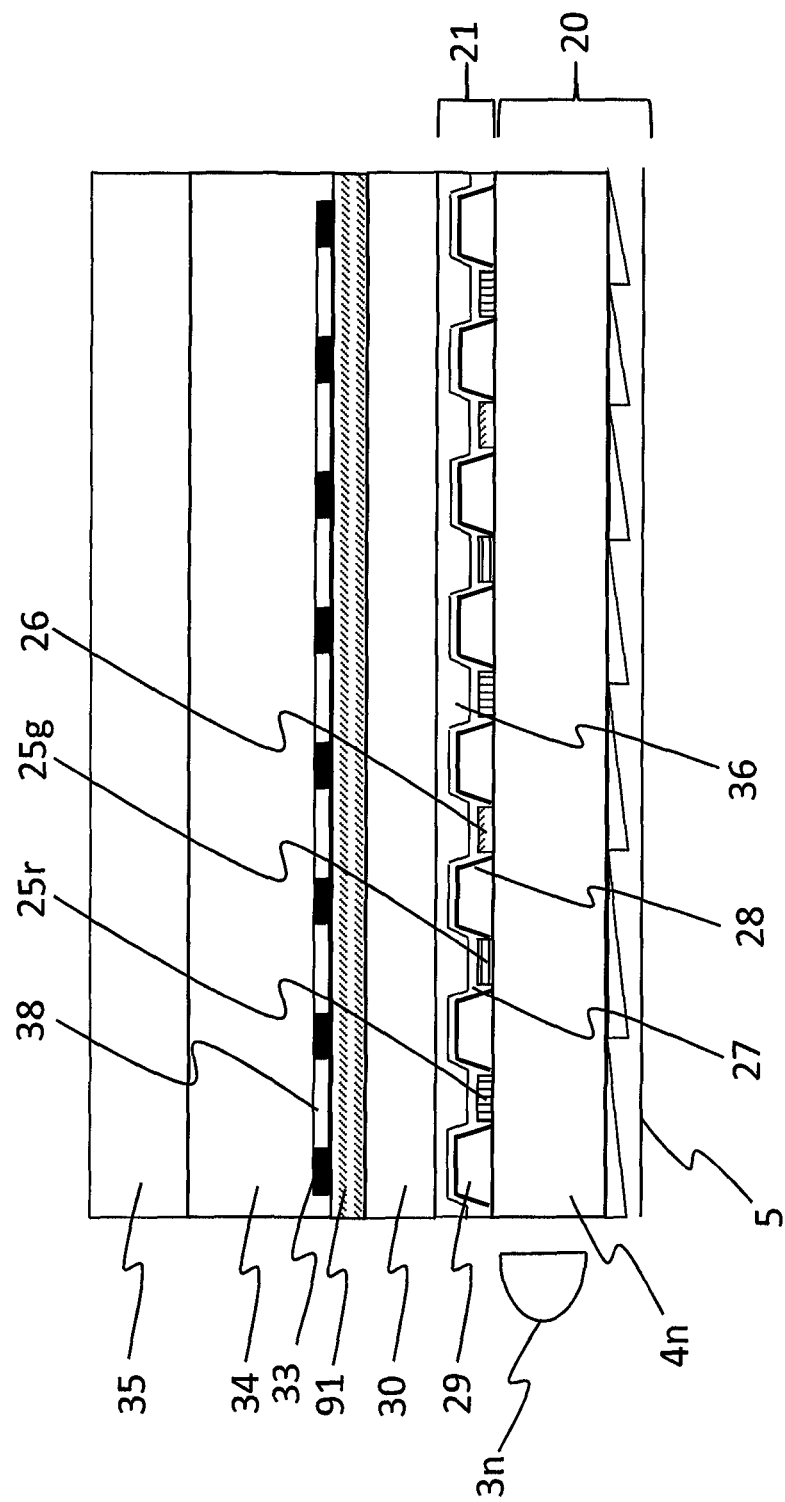
FIG. 12 shows an embodiment of the invention that includes a polymer dispersed liquid crystal cell.

A sixth embodiment of the invention is shown in FIG. 12. The lower polarizer assembly of the embodiment of FIG. 2 has been removed and the liquid crystal cell replaced by polymer dispersion liquid crystal cell (PDLC) 91. The PDLC acts as both a polarizer and polarization rotator when an appropriate voltage is applied.

Figure 13:
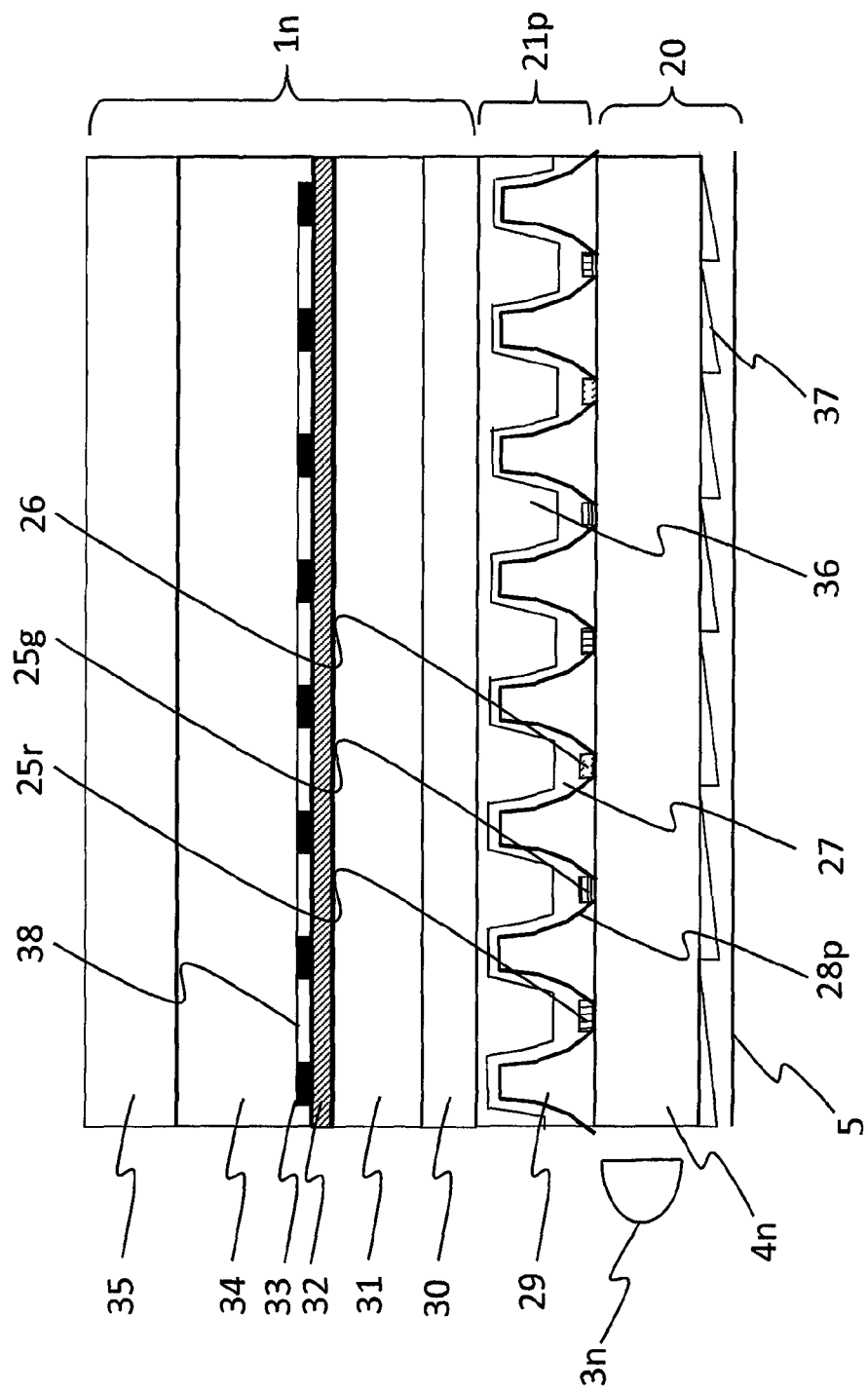
FIG. 13 shows an embodiment that employs curved phosphor and scattering region chamber mirrors to improve the collimation of light leaving the chambers.

A seventh embodiment of the invention is shown in FIG. 13. The chambers holding the phosphor regions 25r,25g and scattering regions 26 possess curved sides (e.g., via curved mirror sections 28p) to improve the collimation of the light leaving these chambers. The phosphor samples within the phosphor regions are localized to a scale significantly smaller than the sub-pixel size. Preferentially, the area of the base of the phosphor is less than $1/10^{th}$ of the sub-pixel area. Preferentially, the shapes of the chambers approximate to compound parabolic reflectors.

Figure 14:
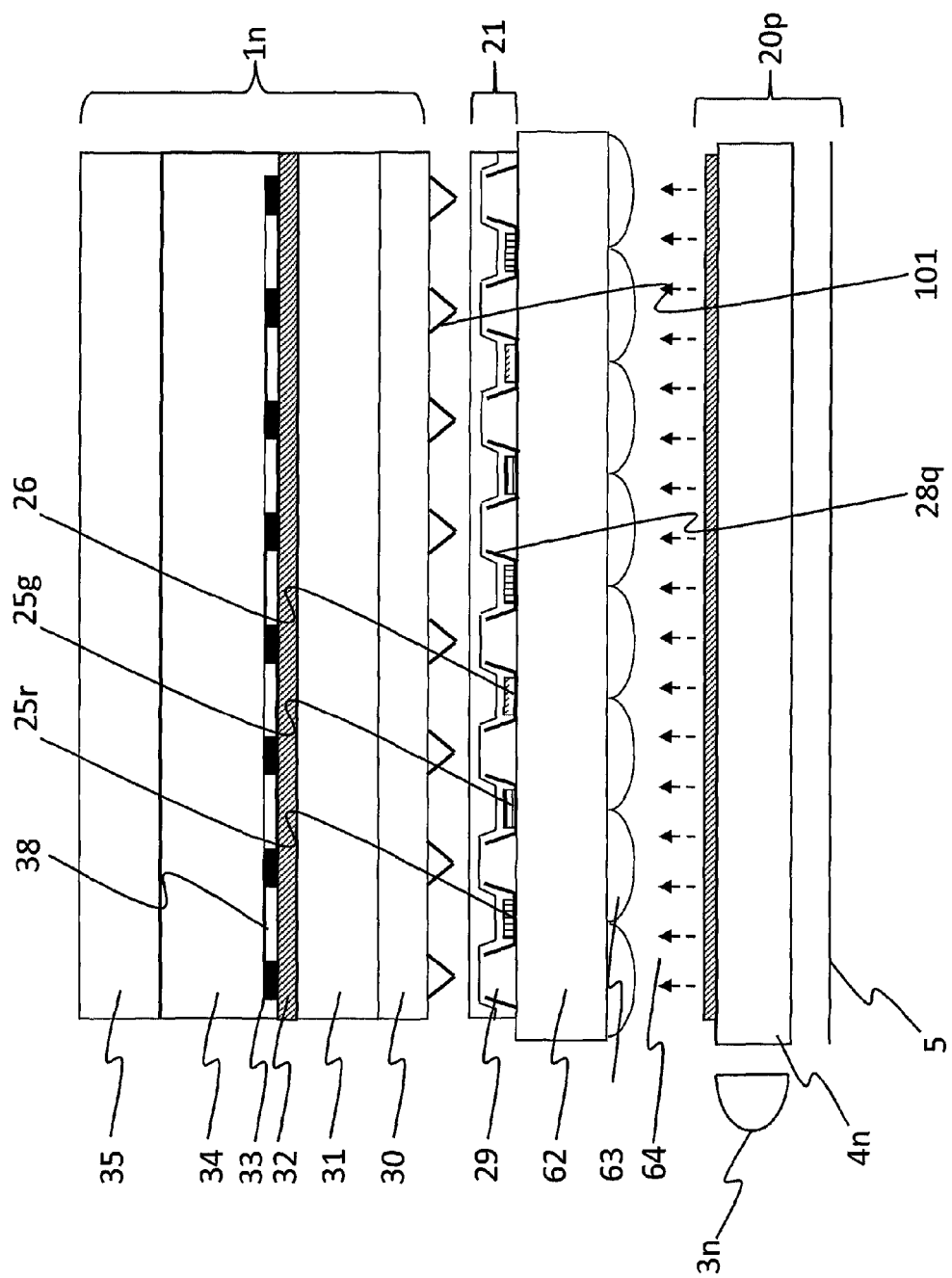
FIG. 14 shows an embodiment that incorporates angled mirror sections to reflect focused backlight rays into modified phosphor and scattering region chambers.

FIG. 14 shows an eighth embodiment that incorporates metal reflectors 101 to reflect backlight light down into the phosphor regions 25r,25g and scattering regions 26. The mirrored sections 28q defining the corresponding chambers are modified so that metal mirrors exist on all sides except the top aperture located between chambers from the perspective of the backlight. The metal reflectors are aligned with the top apertures, and the backlight light is focused between the chambers so that the majority of this light strikes the reflectors 101 and is reflected towards the open apertures of the chambers defined by the mirrored sections 28q. The extraction of light subsequently emitted by the phosphor regions 25r,25g or scattered in the scattering regions 26 is improved by the chamber design. This embodiment circumvents the need for incorporating wavelength selective filters in the design to improve the extraction efficiency.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The invention pertains to a high efficiency colour display that can be used in devices such as mobile phones, PDAs, computer monitors and liquid crystal display TVs. In some embodiments, an entirely standard matrix addressable LCD panel is used. In essence the invention relates to a particular form of phosphor-based backlight in which the requisite coloured light is produced locally to each sub-pixel. This phosphor backlight is relatively cheap to produce, and its use in conjunction with a standard LCD panel leads to a competitive unit price. Efficiency and image quality can be further improved if a modified panel is used.

The invention claimed is:

1. A phosphor-based multi-coloured display, comprising:
   a spatial light modulator comprising an addressable array of apertures each corresponding to a respective sub-pixel in the display;
   an array of phosphor regions each indexed to a corresponding aperture of the spatial light modulator; and
   a backlight which provides quasi-monochromatic light to phosphor within each of the phosphor regions,
   wherein the phosphor within each of the phosphor regions, upon being excited by the quasi-monochromatic light of the backlight, emits light having a colour different from a colour of the quasi-monochromatic light, through the corresponding aperture of the spatial light modulator, and
   the backlight comprises a lightguide and a quasi-monochromatic light source which introduces the light into the lightguide from a side of the lightguide, and the array of phosphor regions is located directly above the lightguide such that light is extracted directly from the lightguide into the phosphor regions.

2. The display according to claim 1, wherein the colour of the quasi-monochromatic light is one of red, green, blue and yellow, and the colour of the light emitted by the phosphor regions comprises one or more of the others of red, green, blue and yellow.

3. The display according to claim 1, the array of phosphor regions further including scattering regions in between the phosphor regions with the scattering regions also being indexed to corresponding apertures of the spatial light modulator, wherein the backlight provides the quasi-monochromatic light to scattering material within each of the scattering regions and the scattering material scatters the quasi-monochromatic light though the corresponding aperture of the spatial light modulator.

4. The display according to claim 1, wherein a distance of separation between the phosphor regions and the corresponding apertures is less than a size of the corresponding apertures.

5. A phosphor-based multi-coloured display, comprising:
   a spatial light modulator comprising an addressable array of apertures each corresponding to a respective sub-pixel in the display;
   an array of phosphor regions each indexed to a corresponding aperture of the spatial light modulator; and
   a backlight which provides quasi-monochromatic light to phosphor within each of the phosphor regions,
   wherein the phosphor within each of the phosphor regions, upon being excited by the quasi-monochromatic light of the backlight, emits light having a colour different from a colour of the quasi-monochromatic light, through the corresponding aperture of the spatial light modulator, and
   further including a colour filter associated with each aperture.

6. The display according to claim 1, wherein the plurality of phosphor regions are positioned within corresponding chambers which act to redirect light emitted by the phosphor towards an outward normal of the display.

7. A phosphor-based multi-coloured display, comprising:
   a spatial light modulator comprising an addressable array of apertures each corresponding to a respective sub-pixel in the display;
   an array of phosphor regions each indexed to a corresponding aperture of the spatial light modulator; and a backlight which provides quasi-monochromatic light to phosphor within each of the phosphor regions, wherein the phosphor within each of the phosphor regions, upon being excited by the quasi-monochromatic light of the backlight, emits light having a colour different from a colour of the quasi-monochromatic light, through the corresponding aperture of the spatial light modulator, the plurality of phosphor regions are positioned within corresponding chambers which act to redirect light emitted by the phosphor towards an outward normal of the display, and walls of the chambers are formed by mirrored sections and/or low index regions.

8. The display according to claim 6, wherein the shape of the chambers approximate compound parabolic reflectors.

9. A phosphor-based multi-coloured display, comprising:
a spatial light modulator comprising an addressable array of apertures each corresponding to a respective sub-pixel in the display;
an array of phosphor regions each indexed to a corresponding aperture of the spatial light modulator; and
a backlight which provides quasi-monochromatic light to phosphor within each of the phosphor regions,
wherein the phosphor within each of the phosphor regions, upon being excited by the quasi-monochromatic light of the backlight, emits light having a colour different from a colour of the quasi-monochromatic light, through the corresponding aperture of the spatial light modulator, and
further comprising an interference filter between the array of phosphor regions and the backlight, the interference filter being designed to allow the quasi-monochromatic light to pass through and excite the phosphor within the phosphor regions over a predefined angular acceptance range, and to reflect the light emitted by the phosphor away from the backlight.

10. The display according to claim 1, wherein the backlight comprises a blue light source.

11. The display according to claim 1, wherein the backlight comprises a UV light source.

12. The display according to claim 11, wherein the array of phosphor regions comprises phosphor regions respectively including red, green and blue phosphors.

13. The display according to claim 1, wherein light from the backlight passes through the array of phosphor regions by way of top apertures within the array of phosphor regions, and the display further includes reflectors positioned between the array of phosphor regions and the spatial light modulator which reflect the light passing through the array of phosphor regions back towards the phosphor regions to excite the phosphor therein.

14. The display according to claim 1, wherein the spatial light modulator comprises at least one of a liquid crystal cell and a polymer dispersion liquid crystal cell.

15. The display according to claim 1, wherein the backlight is a quasi-collimated backlight.

16. The display according to claim 15, further comprising a lens array for focusing the collimated light into the phosphor regions.

17. The display according to claim 15, wherein the backlight comprises a lightguide.

18. The display according to claim 15, wherein the backlight is a direct view backlight.

* * * * *